US006980994B2

(12) United States Patent
Shmueli

(10) Patent No.: US 6,980,994 B2
(45) Date of Patent: Dec. 27, 2005

(54) METHOD, APPARATUS AND COMPUTER PROGRAM PRODUCT FOR MAPPING FILE HANDLES

(75) Inventor: Boaz Shmueli, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 496 days.

(21) Appl. No.: 10/191,508

(22) Filed: Jul. 8, 2002

(65) Prior Publication Data

US 2004/0006565 A1      Jan. 8, 2004

(51) Int. Cl.[7] .......................................... G06F 17/00
(52) U.S. Cl. ..................................... 707/102; 707/100
(58) Field of Search ........................ 707/2, 9–10, 104.1, 707/100–103, 203, 4

(56) References Cited

U.S. PATENT DOCUMENTS

| | | | |
|---|---|---|---|
| 5,566,328 A | 10/1996 | Eastep | |
| 5,713,017 A | 1/1998 | Lin et al. | |
| 5,742,817 A | 4/1998 | Pinkoski | |
| 5,864,669 A | 1/1999 | Osterman et al. | |
| 5,909,540 A | 6/1999 | Carter et al. | |
| 5,918,229 A | 6/1999 | Davis et al. | |
| 5,987,506 A | 11/1999 | Carter et al. | |
| 6,026,474 A | 2/2000 | Carter et al. | |
| 6,085,198 A * | 7/2000 | Skinner et al. | 707/103 R |
| 6,105,038 A | 8/2000 | Douceur et al. | |
| 6,105,039 A | 8/2000 | Douceur et al. | |
| 6,138,120 A | 10/2000 | Gongwer et al. | |
| 6,163,777 A | 12/2000 | Douceur et al. | |
| 6,178,423 B1 | 1/2001 | Douceur et al. | |
| 6,185,564 B1 | 2/2001 | Douceur et al. | |
| 6,460,043 B1 * | 10/2002 | Tabbara et al. | 707/100 |
| 6,493,717 B1 * | 12/2002 | Junkin | 707/102 |
| 6,721,722 B1 * | 4/2004 | Turba | 707/2 |
| 2002/0065810 A1 * | 5/2002 | Bradley | 707/2 |

OTHER PUBLICATIONS

Callaghan, "WebNFS: NFS for the Internet", Unix Review, vol. 15, No. 2, Feb. 1997, pp. 45-50.
Lee et al., "Common Router for Multiple Network File System Servers", IBM Technical Disclosure Bulletin, vol. 38, No. 05, May 1995, pp. 19-22.

* cited by examiner

*Primary Examiner*—Mohammad Ali
*Assistant Examiner*—Sana Al-Hashemi
(74) *Attorney, Agent, or Firm*—Randall J. Bluestone; Anthony V. S. England

(57) ABSTRACT

In one form, in a method for mapping file handles, protocol data elements are created for respective file system protocols. Such a protocol data element identifies a structure of server handles for the data element's corresponding protocol. File system data elements are created for server file systems. Such a file system data element includes a file system identification (FSID) attribute. Responsive to accessing an object of one of the server file systems, a value for the FSID attribute of the corresponding file system data element is created for reconstructing the object's server handle. Creating the value includes parsing, responsive to one of the protocol data elements, an FSID of a server handle for the object.

35 Claims, 9 Drawing Sheets

FIG. 3A

| PROTOCOL ATTRIBUTE | OBJECT STRUCTURE ATTRIBUTE | FILE SYSTEM STRUCTURE ATTRIBUTE |
|---|---|---|

| OBJECT IDENTIFICATION ATTRIBUTE | FILE SYSTEM IDENTIFICATION ATTRIBUTE |
|---|---|

SERVER HANDLE 160 — 330, 335

FIG. 3C

| PROTOCOL ATTRIBUTE | OBJECT STRUCTURE ATTRIBUTE | | FILE SYSTEM STRUCTURE ATTRIBUTE | |
|---|---|---|---|---|
| | BITS 0-15 | BITS 16-31 | BITS 0-7 | |
| A | B | BITS 8-31 | | |

| FILE SYSTEM PATH ATTRIBUTE | SERVER IDENTIFIER ATTRIBUTE | PROTOCOL ATTRIBUTE | FSID ATTRIBUTE | VFSID ATTRIBUTE |
|---|---|---|---|---|
| 355 | 360 | 315 | 335 | 365 |

| FILE SYSTEM PATH ATTRIBUTE | SERVER IDENTIFIER ATTRIBUTE | PROTOCOL ATTRIBUTE | FSID ATTRIBUTE | VFSID ATTRIBUTE |
|---|---|---|---|---|
| /EXPORT/FS1 | 2 | A | 1A83 | 0001 |
| /USR/BIN | 1 | B | ---- | ---- |
| /PROGS | 3 | C | 9982 | 0003 |

352
354

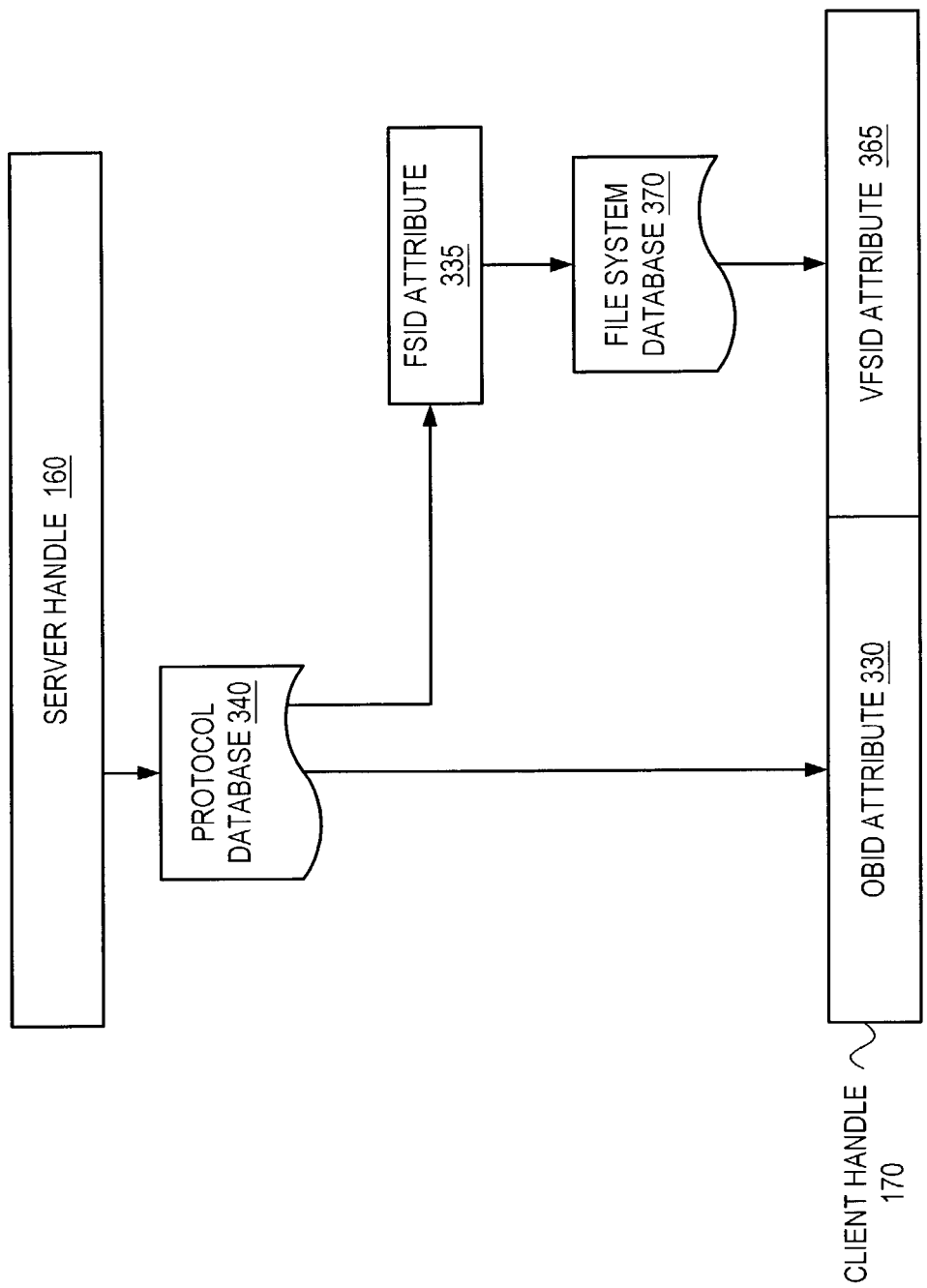

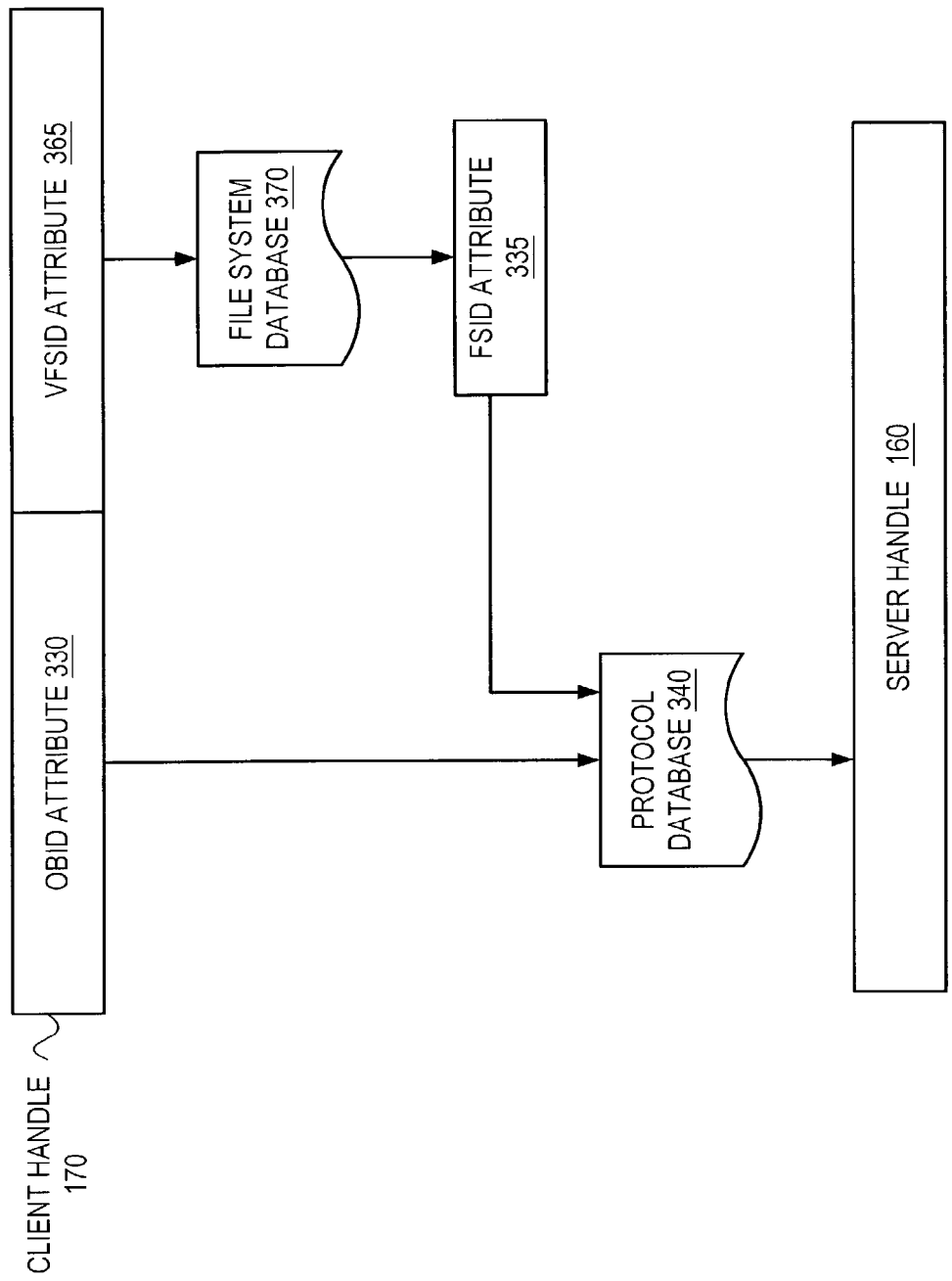

ced or limited length, then this simple solution may not be applicable. In this case, another simple solution to the mapping problem would allocate a new client handle to each new server-server handle combination, and create a database that stores the mapping. But this requires a database entry for each file system object, and thus may require such a large database as to prevent effective caching, or degrade performance. Additionally, such a large database requires a large amount of memory and/or disk space. Therefore, a need exists to improve mapping of file handles.

METHOD, APPARATUS AND COMPUTER PROGRAM PRODUCT FOR MAPPING FILE HANDLES

BACKGROUND

1. Field of the Invention

The present invention relates to file systems, and more particularly to mapping file handles for file systems.

2. Related Art

Computer based information storage systems, such as databases and file systems have been widely utilized by users to access, store, modify and update persistent data. In a computer system, a file system defines the manner in which files are named and placed logically for storage and retrieval. Generally many file systems provide a hierarchical (tree) structure for managing files. A file is placed in a directory (or a folder or subdirectory) at the desired place in the tree structure.

A path is the route from a root directory of a file system to a particular file. A pathname (or path name) is the specification of that path. A file system also includes a format for specifying a path to a file through the structure of directories. Well known examples of file systems operable in a distributed computing environment include Windows NT file system ("NTFS"), Distributed File System ("DFS"), Network File System ("NFS") and the Andrew file system ("AFS").

File handles are used by various file system protocols operating in a distributed computing environment, e.g., NFS, as a way to identify objects stored in the file systems. In these protocols, a computer client ("client") receives a file handle ("handle") from a file server ("server") when first accessing or opening an object. The client uses this handle in subsequent operations to access the object. In some file system protocols the handle is opaque to the client. Many protocols do not impose an internal structure on the handle. In some file system protocols the handle are persistent and survive file server crashes.

Referring to FIG. 1, a computer system 100 is illustrated. In system 100, an intermediary computer 110 is connected to multiple servers 150 and multiple clients 120. Numerous instances of server 150 and client 120 are shown. The intermediary computer 110 performs functions such as file caching. When a client 120 tries to access or open an object 130 stored in a file system 140 of server 150 for the first time using the intermediary computer 110, the client 120 generates a request 115. The intermediary computer 110 routes the request 115 to the appropriate server, e.g., server 150 as message 125. The server 150 then replies with a handle, e.g., server handle 160, which is used by the intermediary computer 110 to access the object 130 in subsequent operations. To complete the operation of accessing object 130, the intermediary computer 110 sends a reply to client 120 that includes a handle, e.g., client handle 170.

Referring to FIG. 2, the client 120 uses the client handle 170 to make subsequent access calls to the object 130. The intermediary computer 110 thus needs to map a server handle to a client handle. For example, upon receiving the client handle 170, the intermediary computer 110 forwards the request to the appropriate server identified by the server handle 160 corresponding to the client handle 170.

If a file system protocol supports handles of variable length, then a simple solution to generate the client file handle 170 from the server file handle 160 would concatenate a unique identifier of the server and the server handle. However, if the file system protocol only supports handles of

SUMMARY

The foregoing need is addressed by the present invention. According to one form of the invention, in a method for mapping file handles, protocol data elements are created for respective file system protocols. Such a protocol data element identifies a structure of server handles for the data element's corresponding protocol. A file system data element is created for the file systems. Such a file system data element includes a file system identification (FSID) attribute. Responsive to accessing an object of one of the server file systems, a value for the FSID attribute of the corresponding file system data element is created for reconstructing the object's server handle. Creating the value includes parsing, responsive to one of the protocol data elements, an FSID of a server handle for the object.

In another aspect, a client handle, which provides a reference for a client to the object, is created for the file system object. Creating the client handle includes parsing an object identification (OBID) attribute from the object's server handle. The parsing is done responsive to the protocol data element for the protocol of the object's file system.

In a still further aspect, the file system data element has a virtual file system identification (VFSID) attribute, and creating the client handle includes concatenating values of the OBID and VFSID attributes.

Objects, advantages, additional aspects and other forms of the invention will be apparent upon reading the following detailed description and referring to the accompanying drawings.

BRIEF DESCRIPTION OF THE DRAWINGS

FIG. 3A is a protocol data element having a plurality of attributes, according to an embodiment of the present invention.

FIG. 3B is a structure of a server handle, according to an embodiment of the present invention.

FIG. 3C illustrates configuration of the protocol data element, according to an embodiment of the present invention.

FIG. 3D is a file system data element having a plurality of attributes, according to an embodiment of the present invention.

FIG. 3E illustrates configuration of the file system data element, according to an embodiment of the present invention.

FIG. 4A is a simplified flow chart illustrating aspects of mapping a server file handle to a client file handle, according to an embodiment of the present invention.

FIG. 5A is a simplified flow chart illustrating a aspects of mapping a client file handle to a server file handle, according to an embodiment of the present invention.

DETAILED DESCRIPTION

The claims at the end of this application set out novel features which applicant believes are characteristic of the invention. The invention, a preferred mode of use, objectives and advantages, will best be understood by reference to the following detailed description of an illustrative embodiment read in conjunction with the accompanying drawings.

Figure 1:
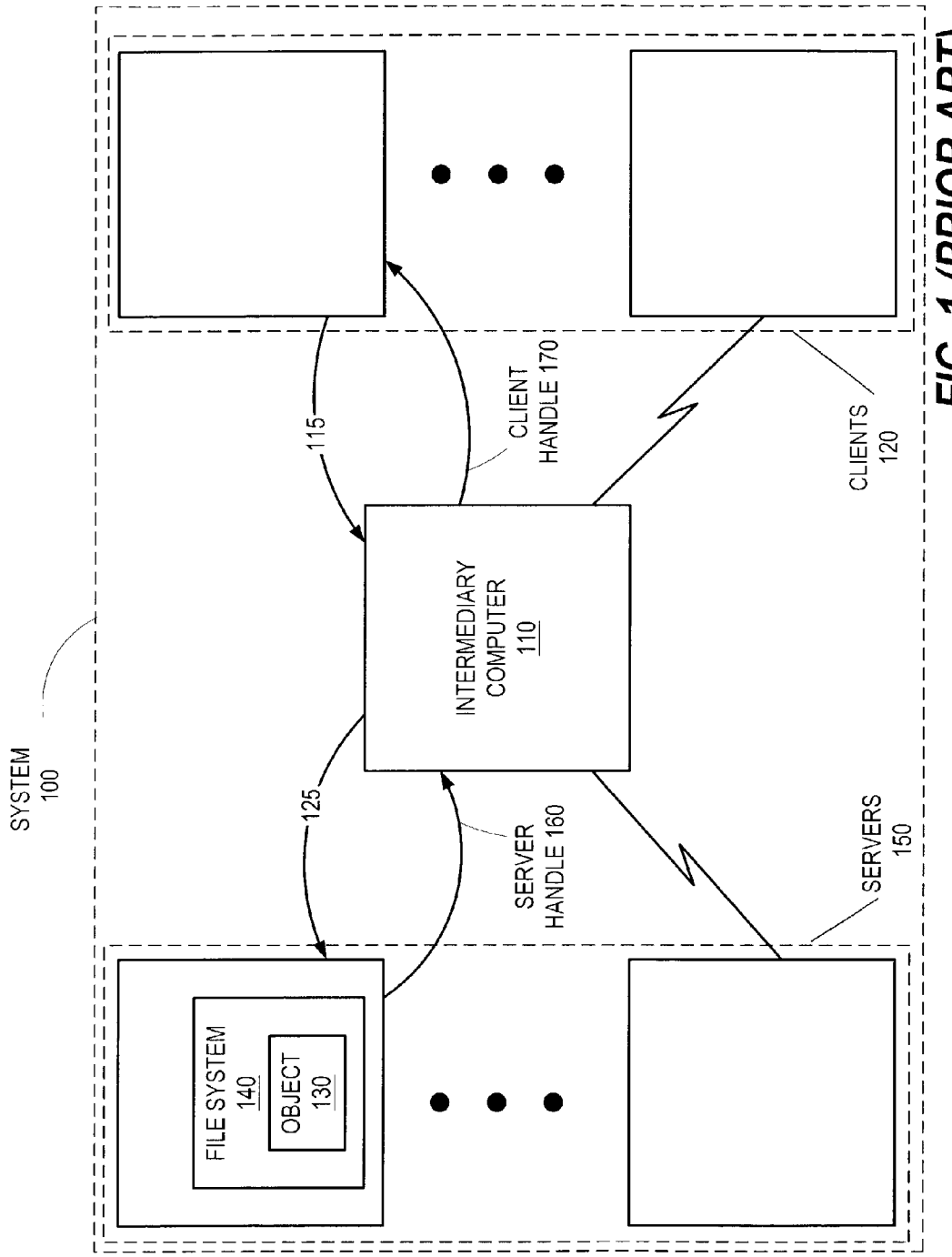
FIG. 1, described above, is a block diagram illustrating an intermediary computer connected to multiple clients and multiple servers, according to the prior art.
Figure 2:
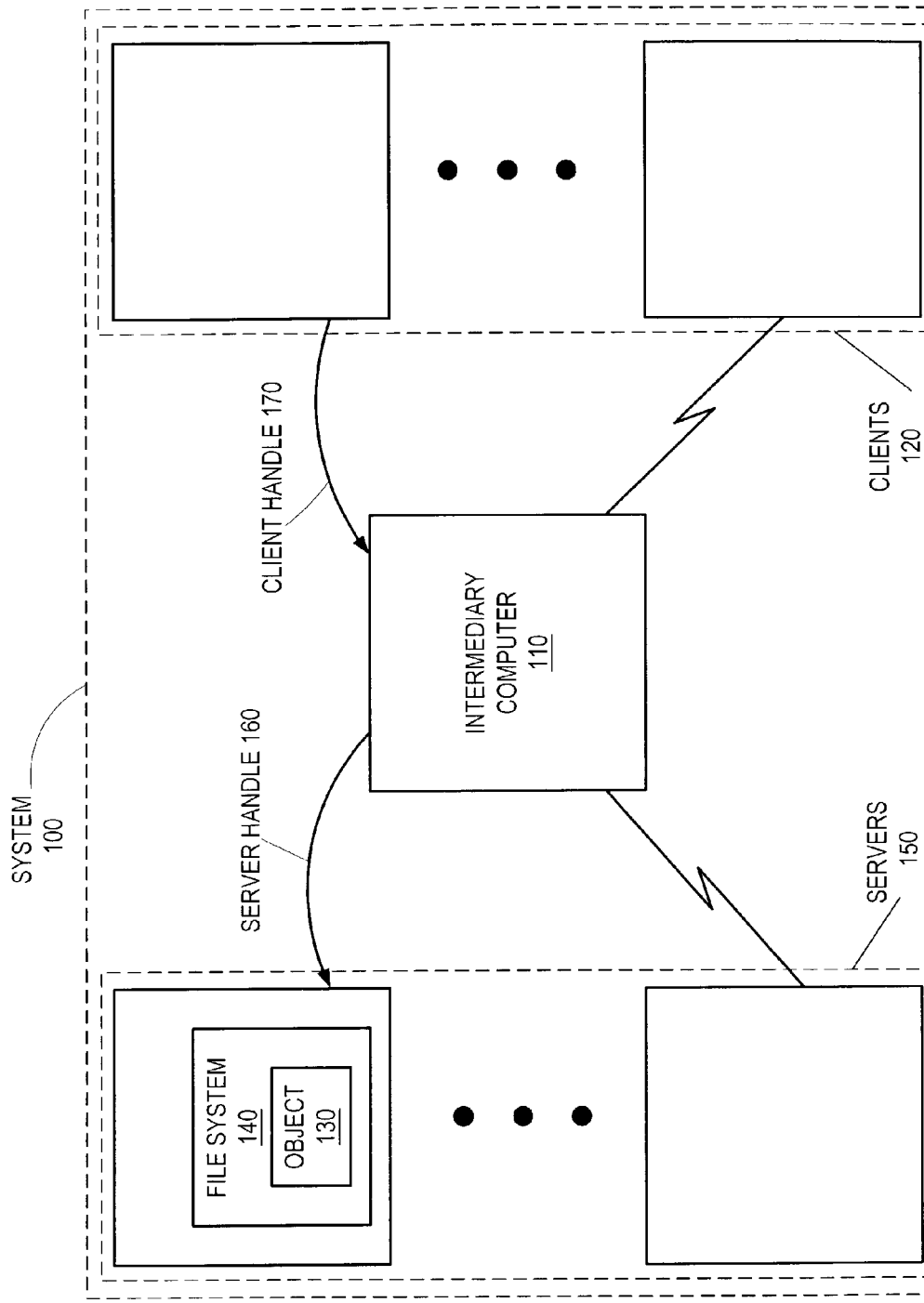
FIG. 2, described above, is a block diagram illustrating use of a client handle and a server handle to re-access an object, according to the prior art.

Referring to FIG. 3A in combination with FIGS. 1 and 2, intermediary computer 110 in system 100 may access a number of servers 150. Each server 150 may each include a number of file systems 140. Each file system operates according to its own predetermined file system protocol. The file systems 140 may use a variety of file system protocols. Some file systems 140 may use the same protocol. Others may use a protocol that no other file system 140 uses. Consequently the number of file systems 140 may or may not be the same as the number of file system protocols which intermediary computer 110 accesses in system 100.

In FIG. 3A, a protocol data element 310 structure is illustrated, according an embodiment of the present invention. Instances of this element 310 are created (or defined) to facilitate mapping of file handles, as will be described below in connection with FIG. 3C. A "data element" may be a record in a database context, for example, or an object in an object-oriented programming context, or an element in a markup language context. An "attribute" may be a field of a database record, a property of an object, or an attribute of an element, for example.

Regarding its structure, the protocol data element 310 has a number of attributes, e.g., a protocol attribute 315, an object structure attribute 320, and a file system structure attribute 325. The value of the protocol attribute 315 provides a label that identifies a file system protocol. There are a number of file system protocols supported by the server 150 (FIGS. 1 and 2). Examples of the plurality of file system protocols supported may include NFS version 2, NFS version 3, and NFS version 4. The value of the object structure attribute 320 defines the structure, e.g., number of bits, of an object identification ("OBID") attribute of the server handle 160. The value of the file system structure attribute 325 defines the structure, e.g., number of bits, of a file system identification ("FSID") attribute of the server handle 160 (FIGS. 1 and 2). It is a common industry practice that most network file system that use an opaque file handle do encode the OBID and FSID in the file handle. Each file system protocol supported may use a different number of bits for the file handle, even within the same server. In the embodiment, the server file handle 160 is 32 bits, but its structure may vary by the protocol used. That is, although the OBID and FSID add up to 32 bits, the specific protocol used defines how many bits are allocated to OBID and how many are allocated to FSID attributes.

Referring to FIG. 3B, a structure of the server handle 160 is illustrated, according an embodiment of the present invention. The OBID attribute 330 uniquely identifies the object within a file system. The FSID attribute 335 uniquely identifies a file system from a plurality of file systems.

Referring to FIG. 3C, for each of the file system protocols that intermediate computer 110 can access in system 100 an instance of a protocol data element 310 is created as an entry in a database 340. Responsive to new protocols being supported, the protocol database 340 is updated by configuring and storing new entries 317, 319, etc. corresponding to the respective new protocols. Similarly, each time an existing protocol is deleted, the protocol database 340 is updated by deleting an entry 317, 319, etc. corresponding to the deleted protocol. For example, a configured protocol data element 310 (FIG. 3A), that is, entry 317, is shown with values assigned to each of the attributes. More specifically, for entry 317 the protocol attribute 315 has a value "A," the object structure attribute 320 has a value "0–15," indicating that the first 16 bits of the server handle are for the OBID for protocol A. The file system structure attribute 325 has a value "16–31," indicating that the last 16 bits of the server handle are for the FSID for protocol A. Each entry 317, etc. corresponds to a supported protocol.

Referring to FIG. 3D, structure for a file system data element 350 is illustrated, according an embodiment of the present invention. Instances of this element 350 are created, i.e., defined, to facilitate mapping of file handles, as will be described in connection with FIG. 3E below. The file system data element 350 includes a file system path attribute 355 for describing a path to the object, a server identifier attribute 360 for uniquely identifying a server, the previously described protocol attribute 315, the previously described FSID attribute 335, and a virtual file system identification (VFSID) attribute 365 for uniquely identifying each file system accessible by the intermediary computer.

Referring to FIG. 3E, for each of the file systems 140 that intermediate computer 110 can access in system 100 an instance of a file system data element 350 is created as an entry in a database 370. Responsive to new file systems 140 being supported, the file system database 370 is updated by configuring and storing new entries 352, 354, etc. for the respective file systems. Similarly, each time a file system 140 is deleted, the file system database 370 is updated by deleting the corresponding entry 352, etc. for the deleted file system. For example, the file system path attribute 355 has a value "/export/fs1," the server identifier attribute 360 has a value "2," the protocol attribute 315 has a value "A" corresponding to the entry 317 in the protocol database 340 (FIG. 3C). If one of the objects 130 has not been accessed for the first time, the remaining two attributes, e.g., FSID attribute 335 and VFSID attribute 365 are configured to have null entries, as illustrated in entry 354. Values for FSID attribute 335 and VFSID attribute 365 are computed and stored in an entry of the file system database 370 when an object of the file system corresponding to the entry is accessed for the first time, as described in the following paragraphs.

Figure 4B:
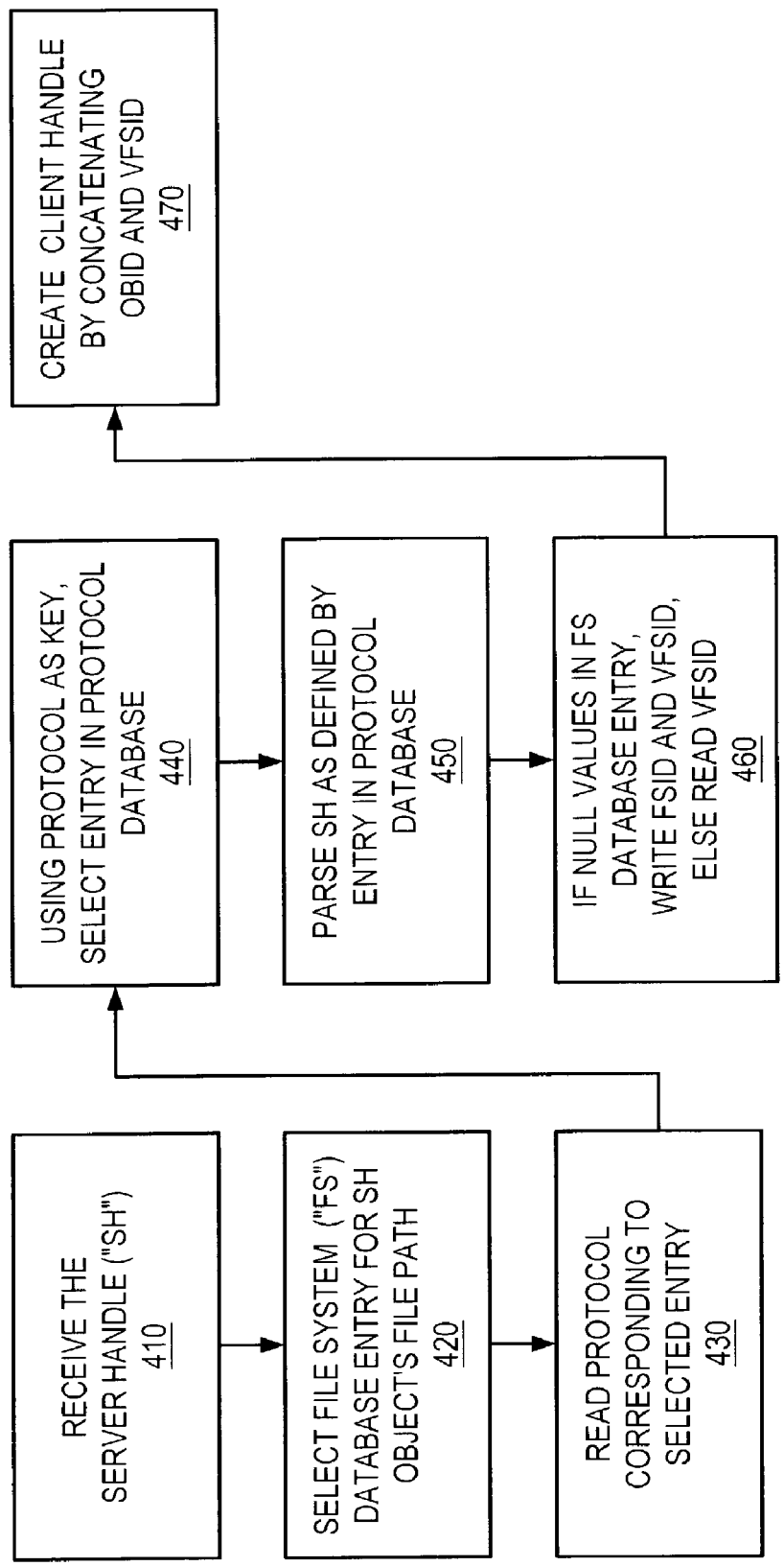
FIG. 4B illustrates additional details of the flow chart of FIG. 4A.

Referring to FIG. 4A, a simplified flow chart illustrates certain of the actions for mapping a server file handle 160 to a client file handle 170, according to an embodiment. In particular the flow chart of FIG. 4A shows how values for FSID attribute 335 and VFSID attribute 365 are computed and stored in an entry of the file system database 370 when an object 130 of a file system 140 corresponding to the entry is accessed for the first time.

As a result of previous actions described earlier, the protocol database 340 has an entry for each file system protocol accessible by the intermediate computer 110. Responsive to an object 130 in a file system 140 being accessed for a client 120, the object's server handle 160 is parsed into its OBID attribute 330 value and FSID attribute 335 value, based on the structure for the OBID and FSID attributes as defined by the values for the object's file system 140 protocol in the protocol database 340 elements 320 and 325.

Next, the file system database 370 is searched to find the VFSID value in the database 370 for the entry corresponding to the file system 140 of the object (assuming a VFSID has already been assigned). The client handle 170 is prepared by concatenating the OBID attribute 330 and the VFSID attribute 365.

Figure 5B:
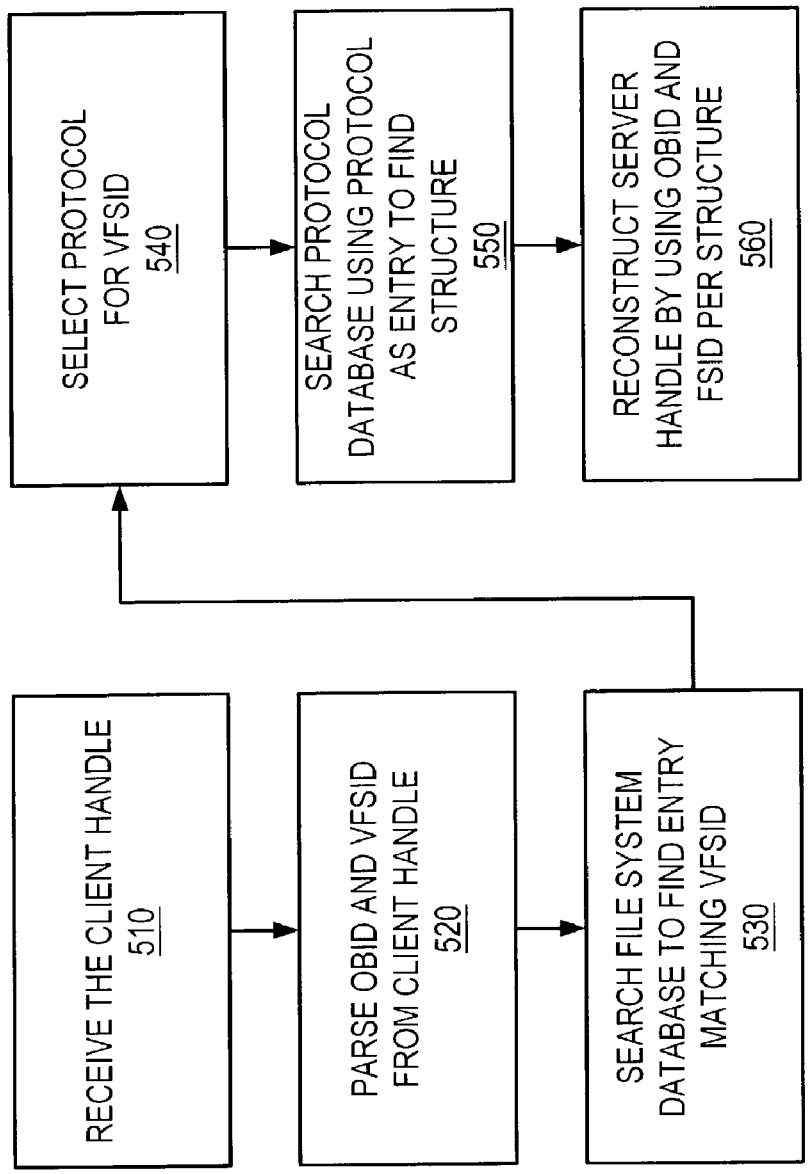
FIG. 5B illustrates additional details of the flow chart of FIG. 5A.

Referring to FIG. 5B, a more detailed flow chart illustrates aspects for mapping the server file handle 160 to the client file handle 170, according to an embodiment. In block 410, the server handle 160 for the object 130 (generated by the server 150) is received. (The file system 140 that includes the object 130 is identified by a its file system path.) In block 420, the file system database 370 is searched to select the entry having a file system path attribute 335 value corresponding to the file system path of the object 130. In block 430, the file system protocol for the selected the file system database 370 entry is read.

In block 440, the protocol read in block 430 is used as a key, and an entry is selected in the protocol database 340 that matches the file system protocol. In block 450, the OBID and FSID values are parsed from the server handle 160 responsive to the values of the object and file system structure attributes 320 and 325 for the selected protocol database 340 entry.

If the FSID attribute 335 and the VFSID attribute 365 values for the selected file system database 370 entry are null entries, then, in block 460, the FSID value parsed from the server handle is written to the FSID attribute 335 for the selected entry, and a VFSID value is assigned and written to attribute 365. Otherwise, the VFSID is merely looked up in the selected file system database entry. In block 470, the client handle 170 is created by concatenating the VFSID with the OBID that was parsed from the server handle. By assigning the VFSID and concatenating it to the OBID, the length of the resulting client handle can be controlled by varying the length of the assigned VFSID.

Referring to FIG. 5A, a simplified flow chart illustrates mapping the client file handle 170 to the server file handle 160, i.e., re-constructing the server handle from the client handle and the databases 340 and 370, according to an embodiment. The client handle 170 is split into the corresponding OBID attribute 330 and VFSID attribute 365 as predefined by a client handle structure. The VFSID attribute 365 is used as a key to search the file system database 370 to select a matching FSID attribute and a file system protocol. The structure of the server handle 160 is looked up in the protocol database 340 for the selected file system protocol, and the server handle 160 is prepared by combining the OBID attribute 330 and the FSID attribute 335 responsive to the indicated structure.

Referring to FIG. 5B, a more detailed flow chart illustrates mapping the client file handle 170 to the server file handle 160, according to an embodiment.

In block 510, the client handle 170 is received from the client 120 to re-access the object 130. In block 520, the client handle 170 is parsed per a predefined client handle structure to identify OBID and VFSID values. In block 530, the file system database 370 is searched to select an entry matching the VFSID parsed from the client handle to find values for the server identifier attribute 360, FSID attribute 335 and protocol attribute 315. In block 540, a file system protocol for the selected entry is read. In block 550, the protocol database 340 is searched for an entry matching the file system protocol read in block 540.The entry matching in the protocol database 340 indicates the server file handle structures for the corresponding file system protocol. In block 560, the server handle 160 is created by combining the OBID attribute 330 parsed from the client handle and the FSID attribute 335 looked up in the file system database 370, per the structure indicated by the selected entry in the protocol database 340.

Figure 6:
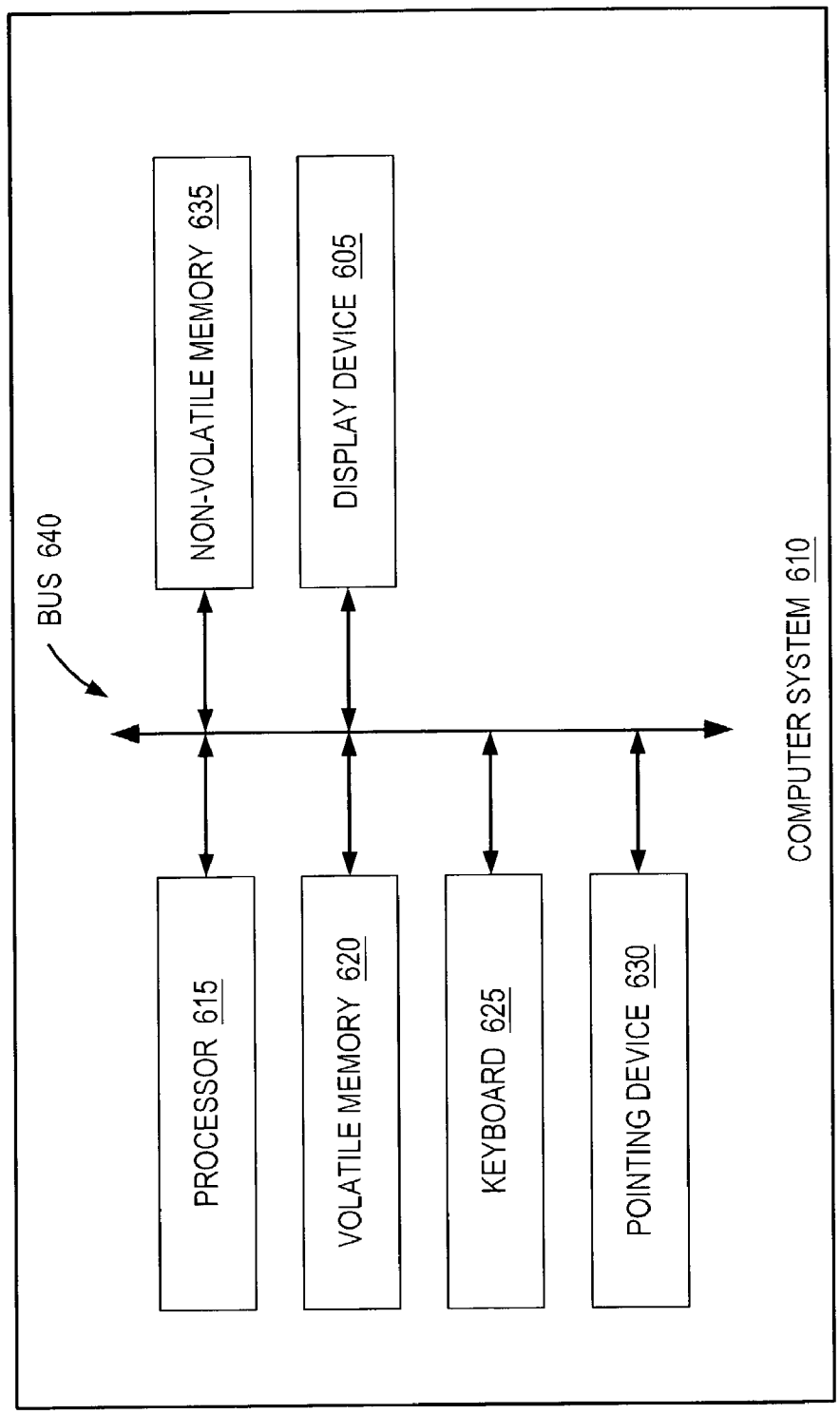
FIG. 6 illustrates a computer system to implement method or apparatus aspects of the present invention, according to an embodiment.

Referring to FIG. 6, a computer system 610 is shown that is generally applicable for the various embodiment described according to the present invention. The system 610 includes a processor 615, a volatile memory 620, e.g., RAM, a keyboard 625, a pointing device 630, e.g., a mouse, a nonvolatile memory 635, e.g., ROM, hard disk, floppy disk, CD-ROM, and DVD, and a display device 605 having a display screen. Memory 620 and 635 are for storing program instructions which are executable by processor 615 to implement various embodiments of a method in accordance with the present invention. Components included in system 610 are interconnected by bus 640. A communications device (not shown) may also be connected to bus 640 to enable information exchange between system 610 and other devices.

In various embodiments system 610 takes a variety of forms, including a personal computer system, mainframe computer system, workstation, Internet appliance, PDA, an embedded processor with memory, etc. That is, it should be understood that the term "computer system" is intended to encompass any device having a processor that executes instructions from a memory medium. In one embodiment computer system 610 may take the form of the intermediary computer 110, the server 150 and/or the client 120.

The memory medium preferably stores instructions (also known as a "software program") for implementing various embodiments of a method in accordance with the present invention. In various embodiments the one or more software programs are implemented in various ways, including procedure-based techniques, component-based techniques, and/or object-oriented techniques, among others. Specific examples include XML, C, C++, Java and Microsoft Foundation Classes (MFC).

It should be appreciated from the foregoing that the invention provides certain advantages. In one respect, the invention is advantageous because the size of required protocol and file system databases are relatively small, since there is no need for a data element, i.e., database entry, for each file system object accessed, while at the same time the length of the client handle can be controlled by varying the length of the VFSID and using padding, if necessary. Another advantage concerns movements of file systems. That is, according to the invention a file system that is moving from a first server to a second, is easily accounted for by changing the value of the server identifier attribute in the file system database. If the two servers use the same FSID for the file system and the same OBID for the objects, then no other modifications may be necessary.

The description of the present embodiments have been presented for purposes of illustration, but are not intended to be exhaustive or to limit the invention to the forms disclosed. Many additional aspects, modifications and variations are also contemplated and are intended to be encompassed within the scope of the following claims. For example, while certain aspects of the present invention have been described in the context of a fully functioning data processing system, those of ordinary skill in the art will appreciate that the processes of the present invention are capable of being distributed in the form of a computer readable medium of instructions in a variety of forms. The present invention applies equally regardless of the particular type of signal bearing media actually used to carry out the distribution. Examples of computer readable media include RAM, flash memory, recordable-type media such as a floppy disk, a hard disk drive, a ROM, CD-ROM, DVD and transmission-type media such as digital and/or analog communication links, e.g., the Internet. As another example, those of ordinary skill in the art will appreciate that the processes of the present invention are capable of being distributed, e.g., the functions provided by the intermediary computer 110 may easily be implemented in the server 150 and/or the client 120.

In cases where multiple intermediary computers connect multiple clients to multiple servers, the file system database 370 may be shared between the intermediary computers, thereby enabling any intermediary computer to map server handles to client handles and vice versa.

In one embodiment, the protocol database 340 and the file system database 370 are persistent. For example, the databases may be made persistent by storing data included in the databases on persistent media such as a magnetic disk. If the intermediary computer 110 crashes, the mapping data may be reloaded from the persistent data upon rebooting the intermediary computer 110.

In one embodiment, the number of file systems included in the plurality of file systems accessible by the intermediary computer 110 is limited by the length of the VFSID attribute 365. In case all protocols use the same length for the OBID's and FSID's, the intermediate computer 110 may use a VFSID with length equal to the length of FSID. In case not all implementations use the same length for OBID's and FSID's, the intermediate computer 110 calculates the minimal length used by any protocol implementation. The VFSID is then concatenated to the OBID and padded with zeros to form a standard file handle. The VFSID length may be predetermined to be fixed or variable.

As an alternative or enhancement to the protocol database 340, the intermediary computer 110 may use various heuristic algorithms to interpolate the location of the OBID and FSID within the server handle 160. For example, the intermediary computer 110 may have knowledge of the OBID and may try to locate this information within the server handle 160. In addition, the intermediary computer 110 may compare server handles that belong to the same file system and examine portions that do not change to arrive at a conclusion regarding the location of the FSID.

In an embodiment, instructions are provided which are operable to perform the following functions for each entry or a record of the protocol database 340, according to the following syntax:

OBJ(fh): Extracts the OBID portion of the server handle,

FSP(fh): Extracts the FSID portion of the server handle, and

FH(obj,fsp): Constructs a server handle from the OBID and FSID.

Also, for each protocol implemented, the following constants define the structure of the server handle 160, according to the indicated syntax:

L_OBJ: The length in bits of the OBID portion of the server handle, and

L_FSP: The length in bits of the FSID portion of the server handle.

In one embodiment, the sum of the above two values may be less than the length in bits of the server handle 160 since some of the bits in the server handle 160 may be unused in some protocol implementations.

To reiterate, many additional aspects, modifications and variations are also contemplated and are intended to be encompassed within the scope of the following claims. Moreover, it should be understood that in the following claims actions are not necessarily performed in the particular sequence in which they are set out.

What is claimed is:

1. A method for mapping file handles in a computer system accessing an object stored on a server, the method comprising:

a) creating protocol data elements, wherein the computer system stores the protocol data elements, the protocol data elements being for respective file system protocols of at least one server accessible by the computer system, wherein such server file system protocols have respective predefined server handle structures, and wherein such a protocol data element identifies the server handle structure for the protocol data element's corresponding file system protocol;

b) creating file system data elements, wherein the computer system stores the file system data elements, the file system data elements being for respective file systems of the server, and wherein such a file system data element has a file system identification (FSID) attribute; and c) providing a client handle of a certain length to a client by the computer system in response to a request from the client for an object stored in one of the server file systems, wherein providing the client handle includes:

getting a server handle for the object from server by the computer system;

parsing an FSID value from the server handle by the computer system responsive to a file system structure attribute of the protocol data element for the file system protocol of the server file system in which the object is stored; and generating, from the parsed FSID value, a virtual file system identification (VFSID) attribute value for including in the client handle by the computer system, wherein the generating varies a length of the VFSID to set the client handle length.

2. The method of claim 1, wherein the providing of the client handle comprises the computer system parsing, responsive to an object structure attribute of the protocol data element for the protocol of the server file system in which the object is stored, an object identification (OBID) value from the object's server handle.

3. The method of claim 2, wherein c) includes:

c1) concatenating the values of the OBID and VFSID attributes by the computer system.

4. The method of claim 1, wherein, after a first instance of accessing the object, c) includes the computer system getting the VFSID value from the file system data element of the server file system in which the object is stored.

5. The method of claim 1, wherein the generating of the VFSID by the computer system in c) is upon a first instance of accessing the object, and wherein a) includes the computer system storing such a created VFSID for the file system data element of the server file system in which the object is stored.

6. The method of claim 5, wherein prior to a first instance of accessing one of the objects of the file system the computer system sets values to null for the FSID and VFSID attributes of the file system data element for the server file system in which the object is stored.

7. The method of claim 3, comprising:
   d) receiving the client handle from client by the computer system in a request by the client for access to the object on the server;
   e) constructing the server handle by the computer system in response to the client request, including:
      e1) parsing the OBID and VFSID values from the client handle;
      e2) selecting one of the file system data elements, wherein the selected file system data element has a value matching the VFSID value parsed from the client handle;
      e3) selecting one of the protocol data elements, wherein the selected protocol data element has a value matching the file system protocol value of the selected file system data element; and
      e4) concatenating the OBID value parsed in e1) and the FSID value of the file system data element selected in e2), wherein the concatenating in e4) is responsive to the protocol data element selected in e3).

8. A computer system for mapping file handles in a computer system accessing an object stored on a server, the computer system comprising:
   a processor; and
   a memory storing instructions operable with the processor for mapping file handles, the instructions being executed for:
   a) creating protocol data elements, wherein the computer system stores the protocol data elements, the protocol data elements being for respective file system protocols of at least one server accessible by the computer system, wherein such server file system protocols have respective predefined server handle structures, and wherein such a protocol data element identifies the server handle structure for the protocol data element's corresponding file system protocol;
   b) creating file system data elements, wherein the computer system stores the file system data elements, the file system data elements being for respective file systems of the server, and wherein such a file system data element has a file system identification (FSID) attribute; and
   c) providing a client handle to a client by the computer system in response to a request from the client for an object stored in one of the server file systems, wherein providing the client handle includes:
      getting a server handle for the object from the server by the computer system;
      parsing an FSID value from the server handle by the computer system responsive to a file system structure attribute of the protocol data element for the file system protocol of the server file system in which the object is stored; and
      generating, from the parsed FSID value, a virtual file system identification (VFSID) attribute value for including in the client handle by the computer system, wherein the generating varies a length of the VFSID to set the client handle length.

9. The computer system of claim 8, wherein the providing of the client handle comprises the computer system parsing, responsive to an object structure attribute of the protocol data element for the protocol of the server file system in which the object is stored, an object identification (OBID) value from the object's server handle.

10. The computer system of claim 9, wherein c) includes:
    c1) concatenating the values of the OBID and VFSID attributes by the computer system.

11. The computer system of claim 8, wherein, after a first instance of accessing the object, c) includes the computer system getting the VFSID value from the file system data element of the server file system in which the object is stored.

12. The computer system of claim 8, wherein the generating of the VFSID by the computer system in c) is upon a first instance of accessing the object and wherein a) includes the computer system storing such a created VFSID for the file system data element of the server file system in which the object is stored.

13. The computer system of claim 12, the instructions being executed for:
    setting values to null for the FSID and for the VFSID attributes of the file system data element for the server file system in which the object is stored prior to a first instance of accessing one of the objects of the file system.

14. The computer system of claim 10, the instructions being executed for:
    d) receiving the client handle from client by the computer system in a request by the client for access to the object on the server;
    e) constructing the server handle by the computer system in response to the client request, including:
       e1) parsing the OBID and VFSID values from the client handle;
       e2) selecting one of the tile system data elements, wherein the selected file system data element has a value matching the VFSID value parsed from the client handle;
       e3) selecting one of the protocol data elements, wherein the selected protocol data element has a value matching the file system protocol value of the selected file system data element; and
       e4) concatenating the OBID value parsed in e1) and the FSID value of the file system data element selected in e2), wherein the concatenating in e4) is responsive to the protocol data element selected in e3).

15. A computer program product for use in mapping file handles in a computer system accessing an object stored on a server, the computer program product comprising computer readable storage media including program logic embedded therein for causing control circuitry to perform:
   a) creating protocol data elements, wherein the computer system stores the protocol data elements, the protocol data elements being for respective file system protocols of at least one server accessible by the computer system, wherein such server file system protocols have respective predefined server handle structures, and wherein such a protocol data element identifies the server handle structure for the protocol data element's corresponding file system protocol;
   b) creating file system data elements, wherein the computer system stores the file system data elements, the file system data elements being for respective file systems of the server, and wherein such a file system data element has a file system identification (FSID) attribute; and
   c) providing a client handle to a client by the computer system in response to a request from the client for an object stored in one of the server file systems, wherein providing the client handle includes:

getting a server handle for the object from the server by the computer system;

parsing an FSID value from the server handle by the compute system responsive to a file system structure attribute of the protocol data element for the file system protocol of the server file system in which the object is stored; and generating, from the parsed FSID value, a virtual file system identification (VFSID) attribute value for including in the client handle by the computer system, wherein the generating varies a length of the VFSID to set the client handle length.

16. The computer program product of claim 15, wherein the providing of the client handle comprises the computer system parsing, responsive to an object structure attribute of the protocol data element for the protocol of the server file system in which the object is stored, an object identification (OBID) value from the object's server handle.

17. The computer program product of claim 16, wherein c) includes:

concatenating the values of the OBID and VFSID attributes by the computer system.

18. The of computer program product of claim 15, wherein, after a first instance of accessing the object, c) includes the computer system getting the VFSID value from the file system data element of the server file system in which the object is stored.

19. The computer program product of claim 15, wherein the generating of the VFSID by the computer system in c) is upon a first instance of accessing the object and wherein a) includes the computer system storing such a created VFSID for the file system data element of the server file system in which the object is stored.

20. The computer program product of claim 19, the program logic embedded therein for causing control circuitry to perform:

setting values to null for the FSID and for the VFSID attributes of the file system data element for the server file system in which the object is stored prior to a first instance of accessing one of the objects of the file system.

21. The computer program product of claim 17, the program logic embedded therein for causing the control circuitry to perform:

d) receiving the client handle from client by the computer system in a request by the client for access to the object on the server;

e) constructing the server handle by the computer system in response to the client request, including:

e1) parsing the OBID and VFSID values from the client handle;

e2) selecting one of the file system data elements, wherein the selected file system data element has a value matching the VFSID value parsed from the client handle;

e3) selecting one of the protocol data elements, wherein the selected protocol data element has a value matching the file system protocol value of the selected file system data element; and e4) concatenating the OBID value parsed in e1) and the FSID value of the file system data element selected in e2), wherein the concatenating in e4) is responsive to the protocol data element selected in e3).

22. A computer system comprising:

first means for creating protocol data elements, wherein the computer system stores the protocol data elements, the protocol data elements being for respective file system protocols of at least one server accessible by the computer system wherein such server file system protocols have respective predefined server handle structures, and wherein such a protocol data element identifies the server handle structure for the protocol data element's corresponding file system protocol;

second means for creating file system data elements, wherein the computer system stores the file system data elements, the file system data elements being for respective file systems of the server, and wherein such a file system data element has a file system identification (FSID) attribute; and third means for providing a client handle to a client by the computer system in response to a request from the client, for an object stored in one of the server file systems, wherein the third means includes:

means for getting a server handle for the object from the server by the computer system;

means for parsing an FSID value from the server handle by the computer system responsive to a file system structure attribute of the protocol data element for the file system protocol of the server file system in which the object is stored; and means for generating, from the parsed FSID value, a virtual file system identification (VFSID) attribute value for including in the client handle by the computer system, wherein the generating varies a length of the VFSID to set the client handle length.

23. The computer system of claim 22, wherein the third means comprises means for the computer system parsing, responsive to an object structure attribute of the protocol data element for the protocol of the server file system in which the object is stored, an object identification (OBID) value from the object's server handle.

24. The computer system of claim 23, wherein the third means includes:

means for concatenating the values of the OBID and VFSID attributes by the computer system.

25. The computer system of claim 22, wherein third means includes means for the computer system getting, after a first instance of accessing the object, the VFSID value from the file system data element of the server file system in which the object is stored.

26. The computer system of claim 22, wherein the generating of the VFSID by the computer system in the third means is upon a first instance of accessing the object and wherein the first means includes means for the computer system storing such a created VFSID for the file system data element of the server file system in which the object is stored.

27. The computer system of claim 23, wherein the third means comprises means for setting values to null for the FSID and for the VFSID attributes of the file system data element for the server file system in which the object is stored prior to a first instance of accessing one of the objects of the file system.

28. The computer system of claim 24, comprising:

means for receiving the client handle from client by the computer system in a request by the client for access to the object on the server;

means for constructing the server handle by the computer system in response to the client request, including:
parsing means for parsing the OBID and VFSID values from the client handle;
first selecting means for selecting one of the file system data elements, wherein the selected file system data element has a value matching the VFSID value parsed from the client handle;
second selecting means for selecting one of the protocol data elements, wherein the selected protocol data element has a value matching the file system protocol value of the selected file system data element; and
combining means for concatenating the OBID value parsed by the parsing means and the FSID value of the file system data element selected by the first selecting means, wherein the concatenating in e4) is responsive to the protocol data element selected by the second selecting means.

29. An apparatus comprising:
a processor;
a memory storing instructions operable with the processor for mapping file handles, the instructions being executed for:
a) creating protocol data elements, wherein the computer system stores the protocol data elements, the protocol data elements being for respective file system protocols of at least one server accessible by the computer system, wherein such server file system protocols have respective predefined server handle structures, and wherein such a protocol data element identifies the server handle structure for the protocol data element's corresponding file system protocol;
b) creating file system data elements, wherein the computer system stores the file system data elements, the file system data elements being for respective file systems of the server, and wherein such a file system data element has a file system identification (FSID) attribute; and
c) providing a client handle to a client by the computer system in response to a request from the client for an object stored in one of the server file systems, wherein providing the client handle includes:
getting a server handle for the object from the server by the computer system;
parsing an FSID value from the server handle by the computer system responsive to a file system structure attribute of the protocol data element for the file system protocol of the server file system in which the object is stored; and
generating, from the parsed FSID value, a virtual file system identification (VFSID) attribute value for including in the client handle by the computer system, wherein the generating varies a length of the VFSID to set the client handle length.

30. The apparatus of claim 29, wherein the providing of the client handle comprises the computer system parsing, responsive to an object structure attribute of the protocol data element for the protocol of the server file system in which the object is stored, an object identification (OBID) value from the object's server handle.

31. The apparatus of claim 30, wherein c) includes:
c1) concatenating the values of the OBID and VFSID attributes by the computer system.

32. The apparatus of claim 29, wherein, after a first instance of accessing the object, the computer system c) includes getting the VFSID value from the file system data element of the server file system in which the object is stored.

33. The apparatus of claim 29, wherein the generating of the VFSID by the computer system in c) is upon a first instance of accessing the object and wherein a) includes the computer system storing such a created VFSID for the file system data element of the server file system in which the object is stored.

34. The apparatus of claim 33, the instructions being executed for:
setting values to null for the FSID and for the VFSID attributes of the file system data element for the server file system in which the object is stored prior to a first instance of accessing one of the objects of the file system.

35. The apparatus of claim 31, the instructions being executed for:
d) receiving the client handle from client by the computer system in a request by the client for access to the object on the server;
e) constructing the server handle by the computer system in response to the client request, including:
e1) parsing the OBID and VFSID values from the client handle;
e2) selecting one of the file system data elements, wherein the selected file system data element has a value matching the VFSID value parsed from the client handle;
e3) selecting one of the protocol data elements, wherein the selected protocol data element has a value matching the file system protocol value of the selected file system data element; and
e4) concatenating the OBID value parsed in e1) and the FSID value of the file system data element selected in e2), wherein the concatenating in e4) is responsive to the protocol data element selected in e3).

* * * * *